United States Patent [19]

Arakawa et al.

[11] Patent Number: 4,519,362
[45] Date of Patent: May 28, 1985

[54] ROTATIONAL POSITION DETECTING APPARATUS FOR INTERNAL COMBUSTION ENGINES

[75] Inventors: Miyao Arakawa, Nagoya; Akihiko Takenaka, Kariya; Masahiro Sato, Toyoake; Hideo Ohyama, Toyota; Hiroo Utsumi, Kariya; Shingo Inoue, Anjo, all of Japan

[73] Assignee: Nippondenso Co., Ltd., Kariya, Japan

[21] Appl. No.: 617,475

[22] Filed: Jun. 5, 1984

[30] Foreign Application Priority Data

Jun. 6, 1983 [JP] Japan .................................. 58-100606

[51] Int. Cl.³ .............................................. F02P 5/04
[52] U.S. Cl. .................................... 123/414; 123/612; 123/618; 123/472
[58] Field of Search ............... 123/472, 476, 477, 414, 123/612, 613, 615, 616, 617, 618

[56] References Cited

U.S. PATENT DOCUMENTS

| | | | |
|---|---|---|---|
| 3,881,453 | 5/1975 | Harper | 123/476 |
| 3,916,863 | 11/1975 | Hohne | 123/617 |
| 4,352,345 | 10/1982 | Menard | 123/414 |
| 4,365,602 | 12/1982 | Stiller | 123/414 |
| 4,407,258 | 10/1983 | Ruf | 123/414 |
| 4,442,822 | 4/1984 | Kondo | 123/414 |
| 4,457,286 | 7/1984 | Katayama | 123/617 |

OTHER PUBLICATIONS

Kovener, Richard W., "A Low Cost Electronic Ignition Control System with a Four Bit Micro Controller", SAE Technical Paper Series No. 820,256, Feb. 1982.

Primary Examiner—Ronald B. Cox
Attorney, Agent, or Firm—Cushman, Darby & Cushman

[57] ABSTRACT

A rotational position detecting apparatus for an internal combustion engine comprises a first and a second signal generator each thereof having a signal rotor rotating in synchronism with the rotation of the engine, a first and a second waveform reshaping circuit and a signal processing circuit. Engine rotational angle signals produced by the first signal generator and engine cylinder reference angular position signals and a specified cylinder angular position signal produced by the second signal generator are reshaped through the first and second waveform reshaping circuits, respectively, and both output signals from the first and second waveform reshaping circuits are supplied to the signal processing circuit. The signal processing circuit separates the reference signals and the cylinder discrimination signal from the output signals of the second waveform reshaping circuit and outputs the separated signals along with the angle signals produced by the first waveform reshaping circuit.

This rotational position detecting apparatus for internal combustion engines is featured in that it is simple in construction and small in size and its operation is hardly susceptible to interference caused by radio noise.

4 Claims, 14 Drawing Figures

FIG. IA
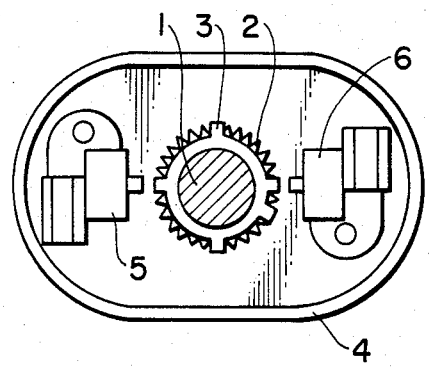
FIG. IB
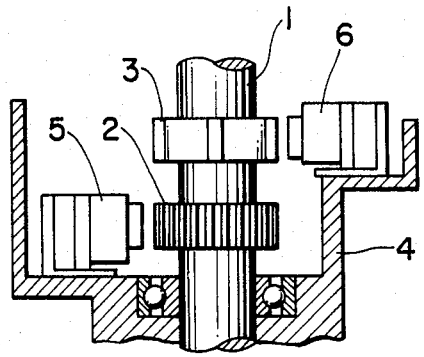

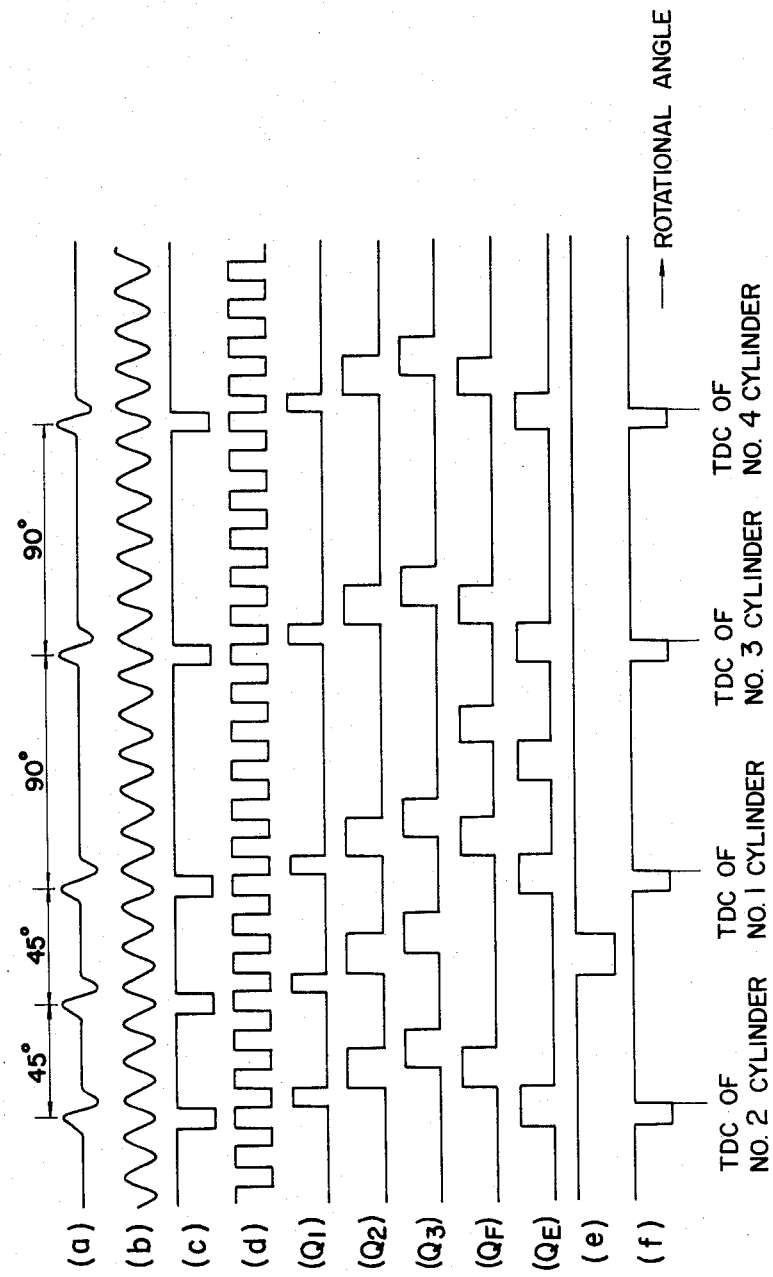

ROTATIONAL POSITION DETECTING APPARATUS FOR INTERNAL COMBUSTION ENGINES

BACKGROUND OF THE INVENTION

1. Field of the Invention

The present invention relates to a rotational position detecting apparatus for generating electric signals associated with the rotation of an internal combustion engine, such as a cylinder discrimination signal, which are used for various control of the engine.

2. Description of the Prior Art

Conventional apparatuses of the above-described kind are provided with two signal rotors both of which are rotated in synchronism with the rotation of an internal combustion engine. One of the signal rotors generates an angle signal at intervals of a given crank angle, while, the other signal rotor generates a reference signal, for example, at the top dead center position of a specified one of engine cylinders, which reference signal is used for the discrimination of the engine cylinders. However, when only one signal rotor is used to generate the reference signal, it is usual that the single signal rotor is provided with only one projection to effect the discrimination of the engine cylinders. The problem with this arrangement is that, at the start of the engine, the timing of generating a reference signal is delayed on the average, thereby deteriorating the starting performance of the engine. While, when using an apparatus provided with both of a signal rotor for generating a reference signal representative of the top dead center position of each engine cylinder, for example, and another signal rotor for generating a cylinder discrimination signal representative of the top dead center position of a specified engine cylinder, it is possible to solve the above-mentioned problem, but, on the other hand, there arouses another problem of increasing the number of signal rotors, thereby rendering the construction complicated and making it difficult to reduce the size of the apparatus.

SUMMARY OF THE INVENTION

It is an object of the present invention to provide a rotational position detecting apparatus for internal combustion engines having two signal rotors and two respective associated pickup coils in which the first signal rotor is provided with both of reference signal generating projections and a cylinder discrimination signal generating projection to generate both of reference signals and a cylinder discrimination signal and the second signal rotor generates angle signals, and these signals generated by both signal rotors are supplied to a signal processing circuit so that the reference signals and the cylinder discrimination signal are separated from each other through the signal processing circuit by utilizing the angle signals generated by the second signal rotor, thereby providing the desired reference signals, cylinder discrimination signal and angle signals discretely by using the two signal rotors and two associated pickup coils.

The apparatus of this invention has great advantages such that not only the apparatus is simple in construction and small in size but also the signal processing circuit functions being hardly affected by noise (radio noise) to cause its misoperation.

BRIEF DESCRIPTION OF THE DRAWINGS

FIGS. 1A and 1B are respectively a plan view and a partially sectional side view showing an exemplifying construction of signal rotors and pickup coils used in a rotational position detecting apparatus for four-cylinder internal combustion engines embodying this invention.

FIG. 9 is a waveform diagram showing operation waveforms appearing at various portions of the apparatus shown in FIG. 8.

DESCRIPTION OF THE PREFERRED EMBODIMENTS

Figure 2:
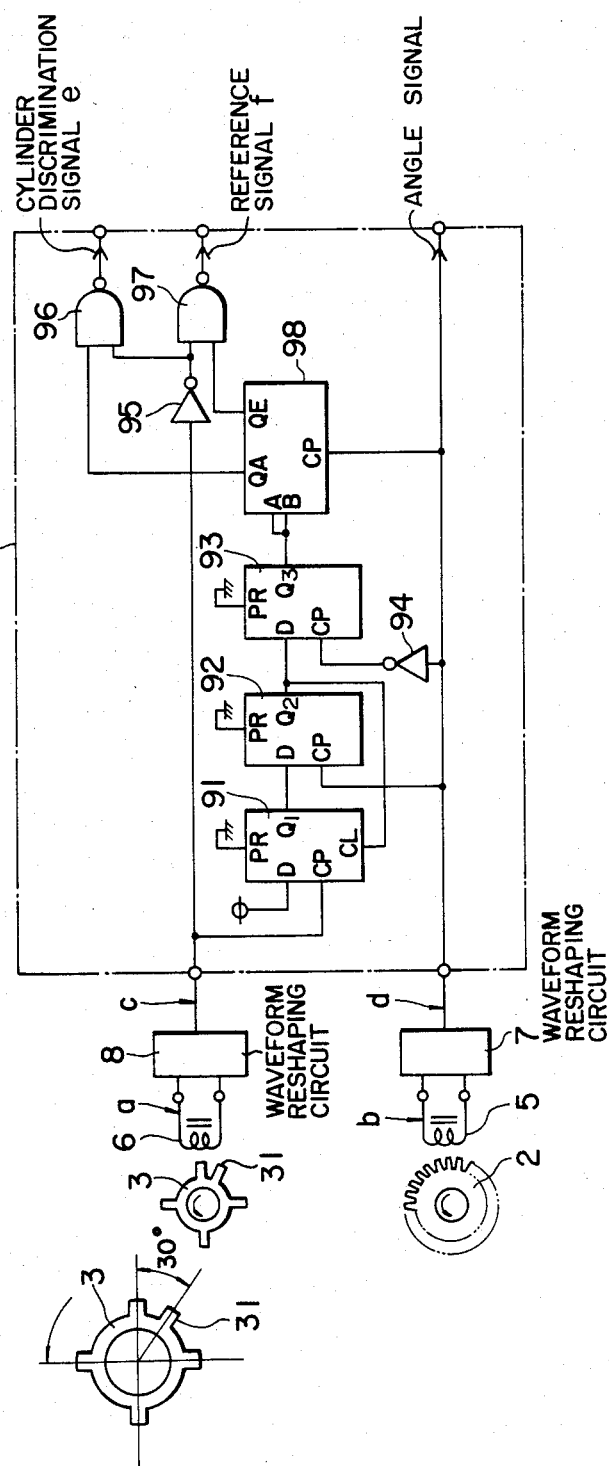
FIG. 2 is a block diagram schematically showing an overall construction of a rotational position detecting apparatus for internal combustion engines of a first embodiment of this invention.

The present invention will now be described with reference to the illustrated embodiments.

FIGS. 1A and 1B are respectively a plan view and a partially sectional side view showing principal parts of signal rotors and pickup coils for use in a first embodiment of this invention applied to a four-cylinder internal combustion engine. On a shaft 1 (a distributor shaft, camshaft, etc.) rotating in synchronism with an engine crankshaft but at one-half of its rotational speed, there are fixed a signal rotor 2 of a magnetic material having twenty four projections and a signal rotor 3 of a magnetic material having four projections each thereof corresponding to a position in advance of the top dead center position of each engine cylinder by a predetermined angle and a single projection corresponding to a predetermined angular position for a specified engine cylinder for discriminating or identifying the specified engine cylinder. Pickup coils 5 and 6 are fixedly mounted within a housing 4 mounted on the engine so that the pickup coil 5 faces the signal rotor 2 and the pickup coil 6 faces the signal rotor 3.

FIG. 2 is a block diagram schematically showing an overall construction of the apparatus of this invention. In FIG. 2, the pickup coils 5 and 6 have their output terminals connected respectively to input terminals of waveform reshaping circuits 7 and 8, each of which comprises a comparator, and voltage signals generated in the pickup coils 5 and 6 are converted to rectangular waveforms through the waveform reshaping circuits 7 and 8, respectively. The output signals from the waveform reshaping circuits 7 and 8 are supplied to a signal processing circuit 9.

The signal processing circuit 9 separates the reference signals and the cylinder discrimination signal from the output signals of the waveform reshaping circuits 7 and 8. Together with the angle signals from the waveform reshaping circuit 7, the above separated signals are supplied to separate control apparatuses (not shown) for controlling the ignition timing, fuel injection quantity, etc. of the engine. In the constituent elements of the signal processing circuit 9, 91, 92 and 93 designate flip-flops, 94 and 95 designate inverters, 96 and 97 designate AND gates, and 98 designates a counter circuit 98.

Figure 4:
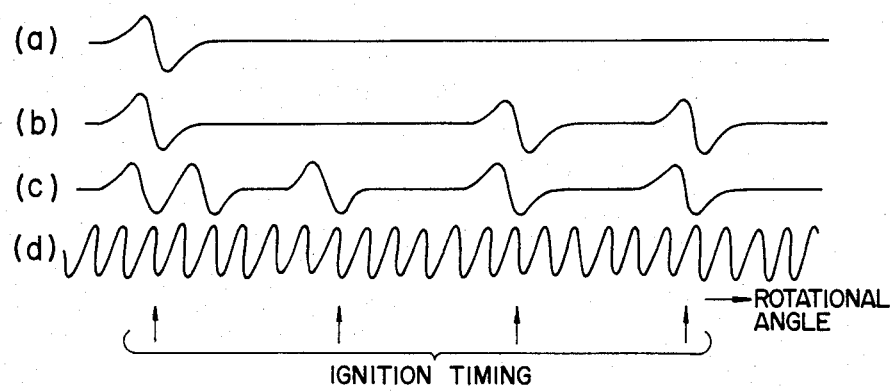
FIG. 4 is a waveform diagram showing the comparison between rotational angle signals generated by a conventional apparatus and those generated by the apparatus of this invention.
Figure 5:
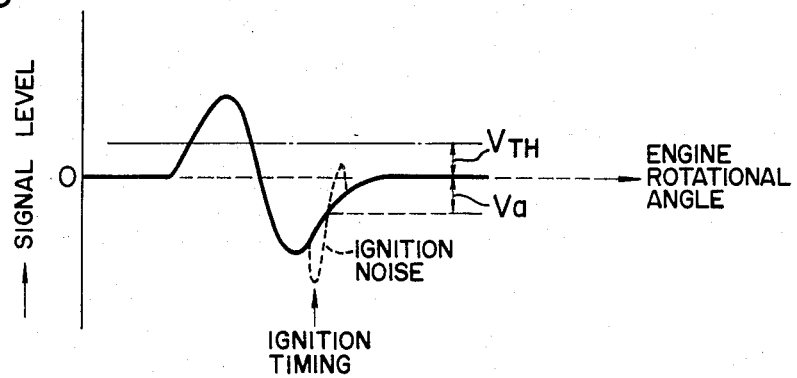
FIG. 5 is an explanatory drawing illustrating a state where ignition noise is superimposed on a portion of the signal waveform shown in FIG. 4.
Figure 6:
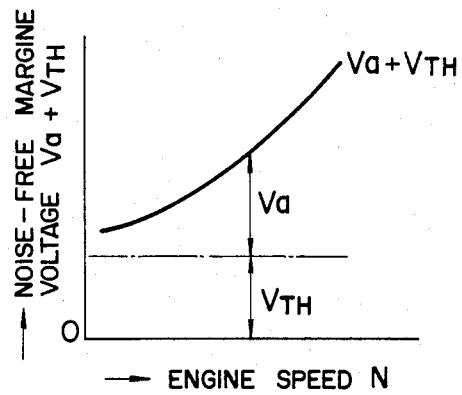
FIG. 6 is a characteristic diagram showing the variation of a noise-free margin voltage as the engine speed varies.

Now, let us consider a noise-free margin voltage (a threshold voltage level which prevents the occurrence of a misoperation caused by noise) for the output voltage waveform of the pickup coil 6. Shown at (a) of FIG. 4 is the output voltage waveform of a pickup coil of a conventional apparatus in which the signal rotor 3 has only one projection. Shown at (b) of FIG. 4 is the output voltage waveform of the pickup coil in a case where a projection of the signal rotor corresponding to a specified engine cylinder is eliminated and a specified cylinder indicative signal is derived from the operation of a signal processor thereby to discriminate the specified cylinder. Shown at (c) of FIG. 4 is the voltage waveform generated in the pickup coil 6 by the rotation of the above-described five projection signal rotor 3 of the apparatus of this invention. Shown at (d) of FIG. 4 is the waveform of the angle signals used in the respective cases shown at (a), (b) and (c) of FIG. 4. In FIG. 4, the ignition during a low engine speed operation, for example, occurs at respective positions indicated by arrows. As shown in FIG. 5, the ignition gives rise to ignition noise, and the waveform reshaping circuit 8 is caused to misoperate depending on the level of the ignition noise. In this case, as shown in FIG. 5, the noise-free margine voltage is the sum $(V_a + V_{TH})$ of a fall $V_a$ in the voltage waveform generated by the pickup coil 6 and a threshold voltage $V_{TH}$ of the waveform reshaping circuit 8. Since the fall $V_a$ in the generated voltage waveform increases with an increase in the engine speed N, the noise-free margine voltage rises as shown in FIG. 6. As seen from FIG. 4, while the ignition occurs four times per each engine revolution, in the case shown at (a) of FIG. 4, the ignition occurs three times at the rotational angular positions where the pickup coil produces no output voltage, and a single time is the case with the case shown at (b) of FIG. 4. Thus, since, at such rotational angular positions, the noise-free margine voltage is formed only by $V_{TH}$, the probability of occurrence of misoperation becomes high. On the contrary, in the case of this invention shown at (c) of FIG. 4, every ignition is accompanied by the voltage waveform generated by the pickup coil 6, so that the apparatus can operate very stably with lowest probability of occurrence of misoperation, especially during a low engine speed operation where the ignition timing is retarded.

Figure 3:
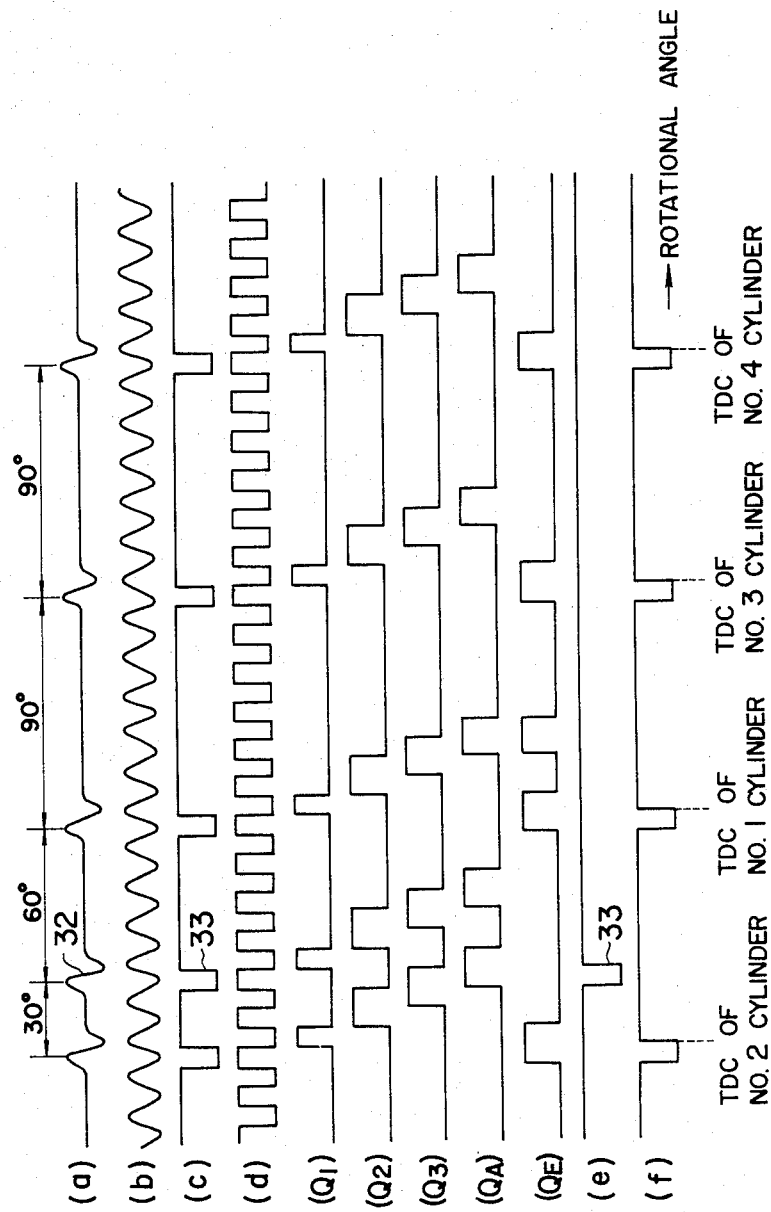
FIG. 3 is a waveform diagram showing operation waveforms appearing at various portions of the apparatus shown in FIG. 2.

Referring to FIGS. 2 and 3, a description will be made of the operation of the apparatus of this invention for separating the reference signals formed by four pulses and a cylinder discrimination signal formed by a single pulse, both of which are produced per each revolution of the signal rotor 3, from the voltage signal formed by five pulses which are produced per each revolution of the signal rotor 3 through the waveform reshaping circuit 8 shown in FIG. 2.

The signal rotor 3 shown in FIG. 2 has four projections arranged at intervals of 90° and a projection designated by 31 arranged at a position which is apart by 30° from one of the four projections. Referring to FIG. 3 showing signal waveforms produced at every revolution of the signal rotor 3 and appearing at various portions of the apparatus shown in FIG. 2, (a) shows the output signal waveform of the pickup coil 6, (b) the output signal waveform of the pickup coil 5, (c) the reshaped signal waveform of the signal a from the waveform reshaping circuit 8, and (d) the reshaped signal waveform of the signal b from the waveform reshaping circuit 7. Further, $(Q_1)$ to (f) of FIG. 3 respectively show the signal waveforms at various portions of the signal processing circuit 9. Each of the flip-flops 91, 92 and 93 and the counter 98 operate in synchronism with the rise of its input clock pulse CP. The output signal $Q_A$ of the counter 98 attains a high level in synchronism with the rise of the second signal d counted from the rise of the signal c and attains a low level in synchronism with the rise of the following signal, namely, the third signal d. The other output signal $Q_E$ of the counter 98 attains a high level in synchronism with the rise of the sixth signal d counted from the rise of the signal c and attains a low level in synchronism with the rise of the following signal, namely, the seventh signal d. The gate 96 logically operates to pass the signal c when the output signal $Q_A$ of the counter 98 has a high level. The gate 97 logically operates to pass the signal c when the output signal $Q_E$ of the counter 98 has a high level. Thus, only a waveform 32 in the signal a generated by the projection 31 of the signal rotor 3, and consequently a waveform 33 in the signal c, passes through the gate 96. Thus, it is possible to obtain the cylinder discrimination signal e, which is generated as a single pulse at every revolution of the signal rotor 3, at the output of the gate 96. At the same time, the waveforms in the signal c other than the waveform 33 pass through the gate 97. Thus, it is possible to obtain the reference signals f, which are generated as four pulses at every revolution of the signal rotor 3, at the output of the gate 97.

Figure 7:
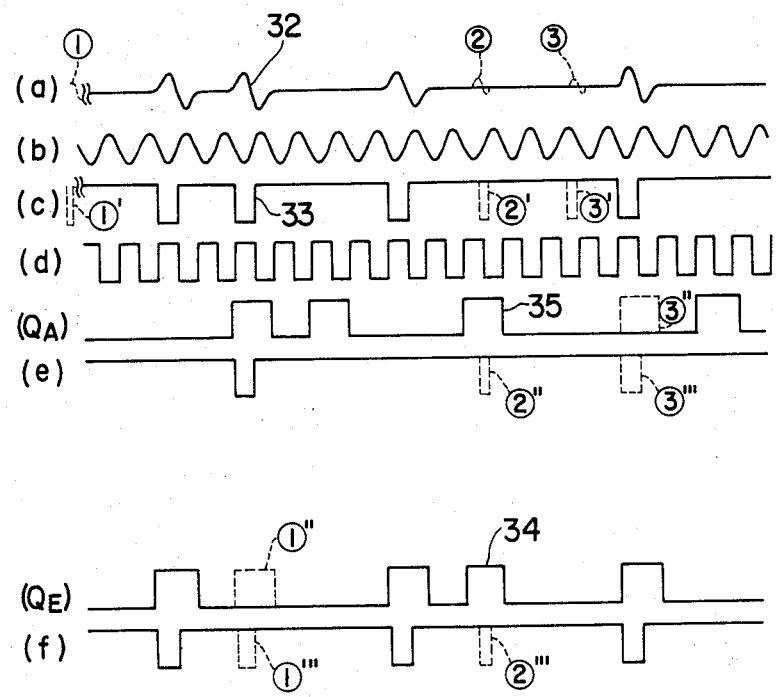
FIG. 7 is an explanatory drawing illustrating a case where a misoperation of the apparatus of this invention is caused by noise.

The apparatus of this invention functions to prevent the occurrence of a misoperation due to contingent noise which is superimposed on the output signal a of the pickup coil 6. Referring to FIG. 7, there occurs a misoperation by the reference signals f, which is caused by the contingent noise superimposed on the signal a, in the following two cases. One is a case where noise ① superimposed on the signal a produces a misoperative waveform ①' in the reshaping output waveform so that a misoperative waveform ①" appears in the signal $Q_E$, which causes the cylinder discrimination signal 33 contained in the signal c to pass the gate 97, thereby causing a misoperative waveform ①''' to appear in the reference signal f. The other is a case where noise ② is superimposed on the portion of the signal a corresponding to the position of a waveform 34 in the signal $Q_E$ which is produced by the waveform 32 in the signal a.

The above-mentioned two misoperations occur only when noise occurs in two particular periods, respectively, in the waveform of the signal b. In this embodiment, the signal b includes 24 pulses produced at every revolution of the signal rotor 3, so that the probability of appearance of the misoperative waveforms in the reference signals f being caused by noise superimposed on the signal a becomes 2/24=1/12. Thus, the occurrence of misoperations by the reference signals f due to noise may be removed practically in all cases.

Similarly, there are two cases where a misoperation by the cylinder discrimination signal e is caused to occur due to noise. One is a case where noise shown at ③ in FIG. 7 is superimposed on the waveform a, so that a misoperative waveform shown at ③″ appears in the waveform $Q_A$, which causes a misoperative cylinder discrimination signal ③‴ to be produced. Since the number of the pulse signals c causing such a misoperation to occur is 4 per each revolution of the signal rotor 3 and the misoperation causing pulse signals may occur in four periods of the signal b, the probability of occurrence of such misoperations becomes 4/24. The other is a case where noise ② is superimposed on the portion of the signal a corresponding to the position of a signal waveform 35 in the signal $Q_A$ and it is reshaped as a pulse signal ②′ to appear in the signal c, which then passes the gate 96 to give rise to a misoperative cylinder discrimination signal ②″. The number of pulse signals in the signal $Q_A$ which are possible to cause such a misoperation is four per each revolution of the signal rotor 3 and the misoperation may occur totally in four periods of the signal b. Thus, the probability of occurrence of the misoperation becomes 4/24. If the above-described two cases are considered in combination, the resultant probability of occurrence of the misoperative cylinder discrimination signals amounts to $4/24 + 4/24 = \frac{1}{3}$.

Figure 8:
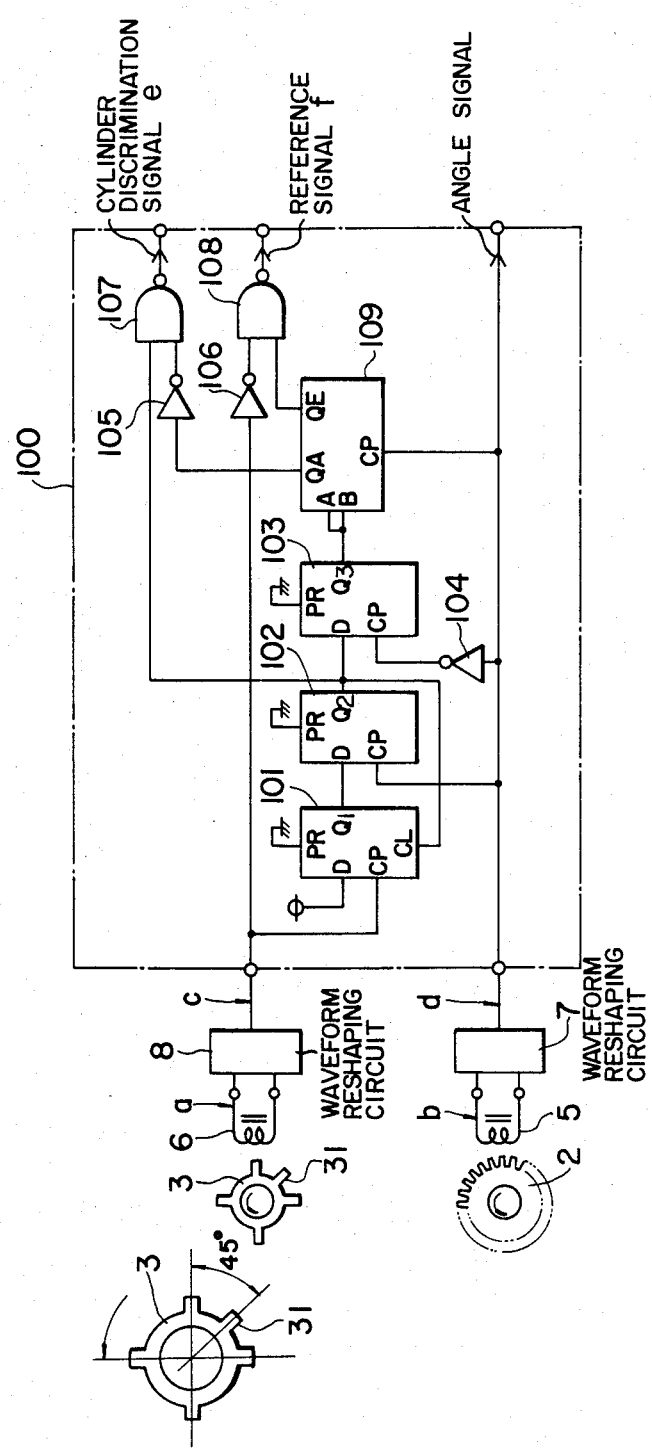
FIG. 8 is a block diagram schematically showing an overall construction of an apparatus of a second embodiment of this invention employing signal rotors which differ in shape from those of the first embodiment of this invention shown in FIG. 2.

In the first embodiment of this invention shown in FIG. 2, the projection 31 of the signal rotor 3 is provided at a position apart from one of the four projections by an angle of 30°. Now, in the second embodiment of this invention, the projection 31 is provided at a central position between two projections of the signal rotor 3 to be apart therefrom by an angle of 45°. This construction is advantageous in preventing an output voltage of the associated pickup coil from being decreased due to a reduction in an amount of magnetic flux variation caused by a reduced space interval between the adjacent projections of the signal rotor 3 having a smaller diameter. The signal processing circuit of this embodiment is constructed as shown in FIG. 8 and the signal waveforms generated thereby are shown in FIG. 9.

In the above-described embodiments of this invention, each of the pickup coils has been shown to be of the electromagnetic pickup type. However, this invention is not limited thereto, but it is possible that any one of sensing elements including Hall generators, magnetoresistance elements, photoelectric conversion elements or the like may be used in this invention.

Figure 10A:
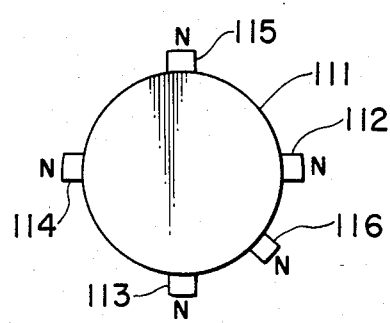
FIGS. 10A and 10B respectively show schematically a signal rotor of a magnetic material for producing reference signals and a cylinder discrimination signal and a signal rotor of a magnetic material for producing angle signals.
Figure 10B:
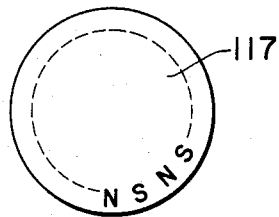

When employing Hall elements, the signal rotors have respective shapes shown in FIGS. 10A and 10B. While, if photoelectric conversion elements are employed, the signal rotors have respective shapes shown in FIGS. 11A and 11B.

In FIGS. 10A and 10B, numeral 111 designates a signal rotor made of a magnetic material, 112, 113, 114 and 115 reference signal producing magnets, and 116 a cylinder discrimination signal producing magnet. Numeral 117 designates an angle signal producing signal rotor made of a magnetic material and provided with a plurality of magnetic poles along its outer periphery.

Figure 11A:
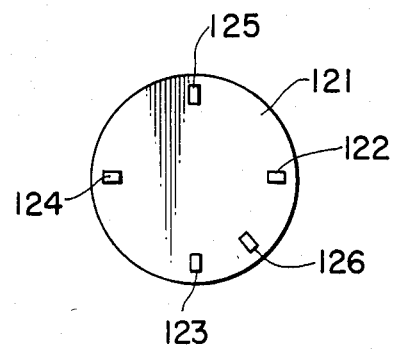
FIGS. 11A and 11B respectively show schematically a slit disc type signal rotor for producing reference signals and a cylinder discrimination signal and a slit disc type signal rotor for producing angle signals.
Figure 11B:
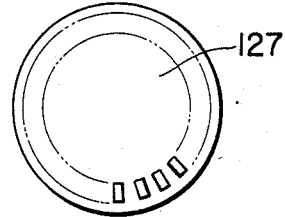

In FIGS. 11A and 11B, numeral 121 designates a slit disc type signal rotor, 122, 123, 124 and 125 reference signal producing slits, and 126 a cylinder discrimination signal producing slit, both thereof producing signals electrooptically. Numeral 127 designates a slit disc type signal rotor having a number of slits provided therein to produce angle signals electrooptically.

Further, it is also possible to use a microcomputer in the signal processing circuit so as to make it perform the above-described operations.

From the foregoing descriptions, it will be seen that the apparatus of this invention is simple in construction and small in size and yet has a great advantage of strongly preventing misoperations from occurring in the apparatus due to noise by virtue of the two features of the present invention such that firstly the ignition-noise-free margin voltage is increased by the output voltage of the pickup coil, as explained in conjunction with FIGS. 4 and 5 in comparison with conventional apparatuses, and secondly the signal processing circuit of this invention functioning to separate the reference signals and the cylinder discrimination signal from each other can assure its operations to be hardly susceptible to misoperations due to noise.

We claim:

1. A rotational position detecting apparatus for internal combustion engines comprising:

first and second signal producing means each thereof including a signal rotor fixedly mounted on a rotary shaft rotating in synchronism with the rotation of an internal combustion engine and rotational position detecting elements arranged to face said signal rotor, said first signal producing means producing angle signals at intervals of a predetermined rotational angle of said engine, the signal rotor of said second signal producing means provided with a plurality of first signal producing positions each thereof corresponding to a reference angular position of one of a plurality of cylinders of said engine and a second signal producing position between two adjacent ones of said first signal producing positions and corresponding to a predetermined angular position of a specified one of said engine cylinders;

a first and a second waveform reshaping circuit for reshaping the waveform of output signals from said first and second signal producing means, respectively; and a signal processing circuit for receiving output signals from said first and second waveform reshaping circuits and utilizing the reshaped angle signals supplied from said first waveform reshaping circuit as clock signals to separate reference signals indicative of said reference angular positions of said engine cylinders and a cylinder discrimination signal indicative of said predetermined angular position of said specified engine cylinder from among the output signals of said second waveform reshaping circuit and to output said reference signals and said cylinder discrimination signal.

2. An apparatus according to claim 1, wherein said signal processing circuit includes a circuit being triggered by said clock signals and receiving the output signals of said second waveform reshaping circuit to generate first and second delayed signals each thereof being delayed by a rotational angle corresponding to a predetermined number of said clock signals, and a first and a second gate circuit for respectively receiving said first and second delayed signals as gate signals thereof and thereby gating the output signals from said second waveform reshaping circuit to separate therefrom said reference signals and said cylinder discrimination signal and to output said reference signals and said cylinder discrimination signal.

3. An apparatus according to claim 1, wherein each of said first and second signal producing means comprises at least one of an electromagnetic pickup detector, a Hall element detector, a magnetoresistance element detector and a photoelectric conversion element detector.

4. An apparatus according to claim 2, wherein each of said first and second signal producing means comprises at least one of an electromagnetic pickup detector, a Hall element detector, a magnetoresistance element detector and a photoelectric conversion element detector.

* * * * *